H. E. OSTER.
SPOTLIGHT.
APPLICATION FILED DEC. 18, 1919.
1,430,839.
Patented Oct. 3, 1922.
2 SHEETS—SHEET 1.
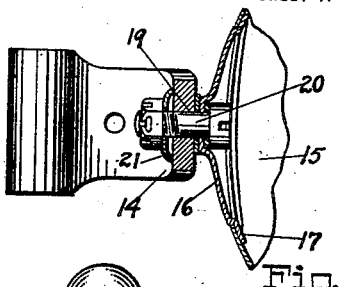
Fig. V
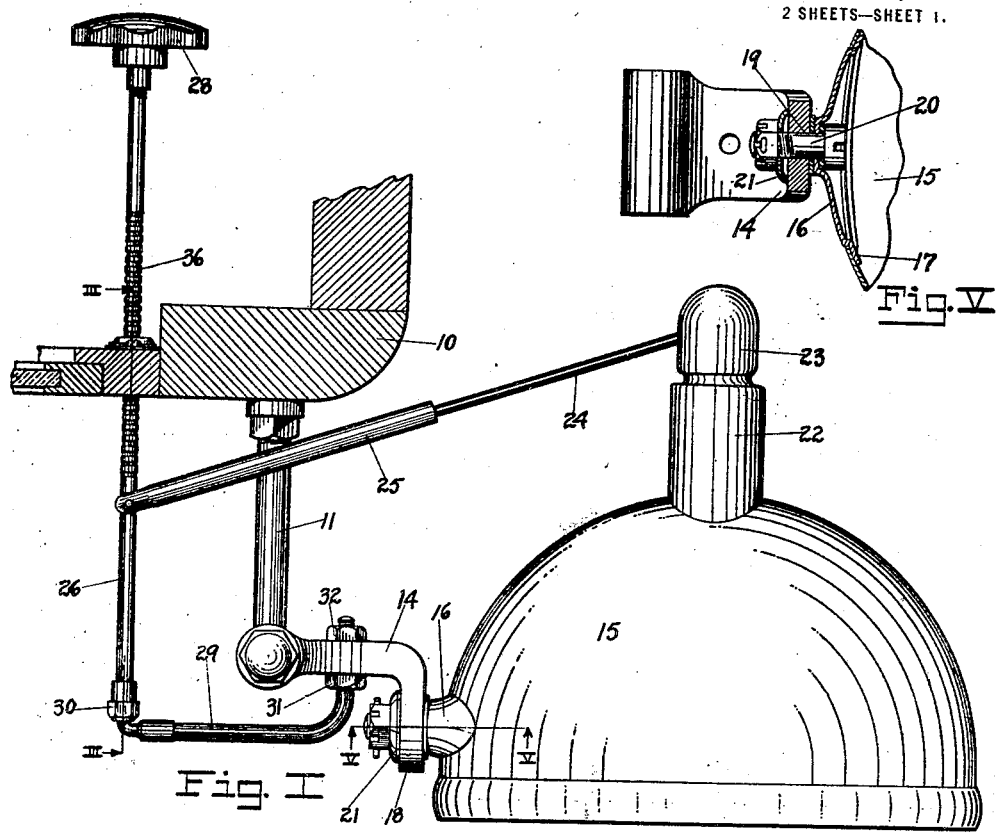
Fig. I
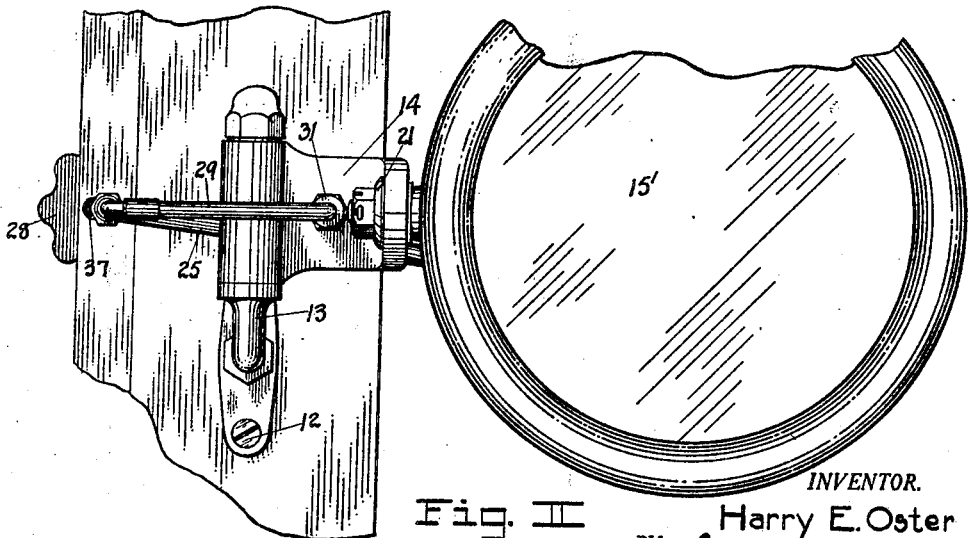
Fig. II
INVENTOR.
Harry E. Oster
BY Chester W. Brazelton
ATTORNEY.

H. E. OSTER.
SPOTLIGHT.
APPLICATION FILED DEC. 18, 1919.
1,430,839.
Patented Oct. 3, 1922.
2 SHEETS—SHEET 2.
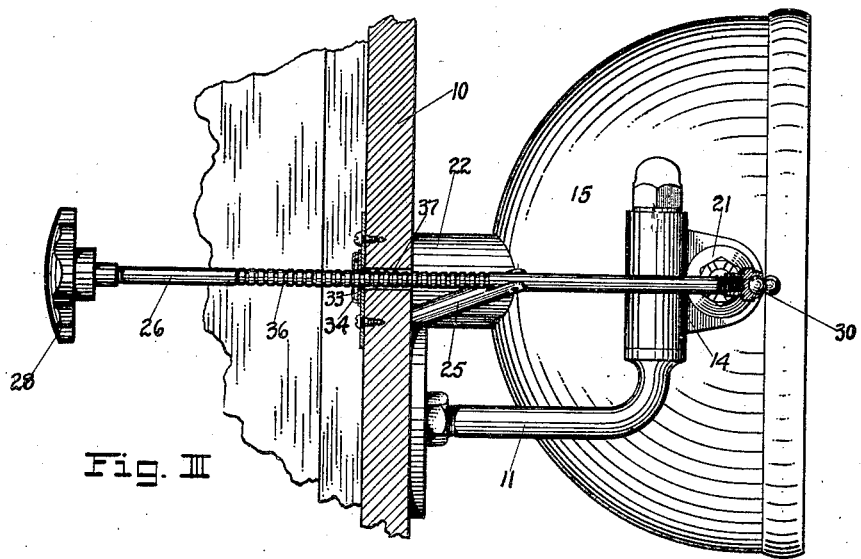
Fig. III
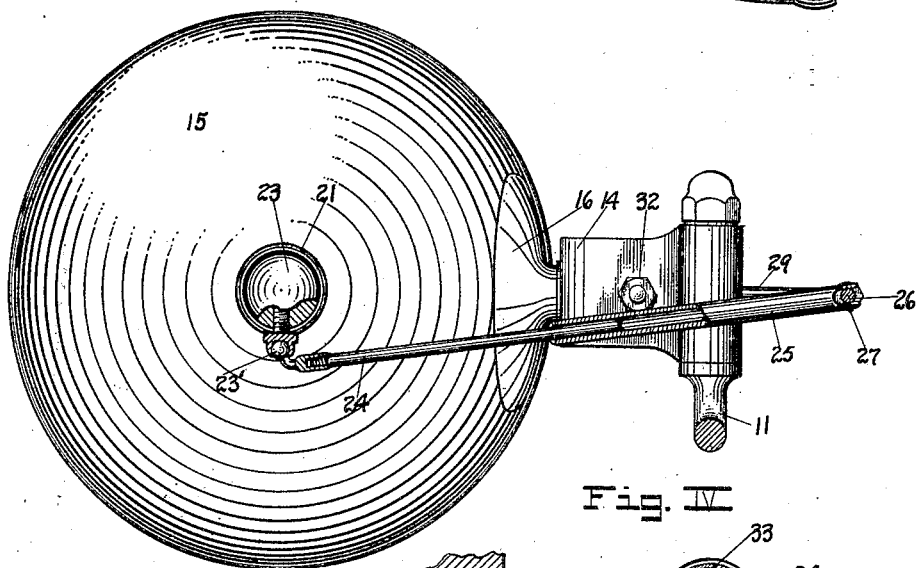
Fig. IV
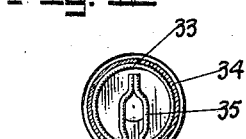
Fig. VII
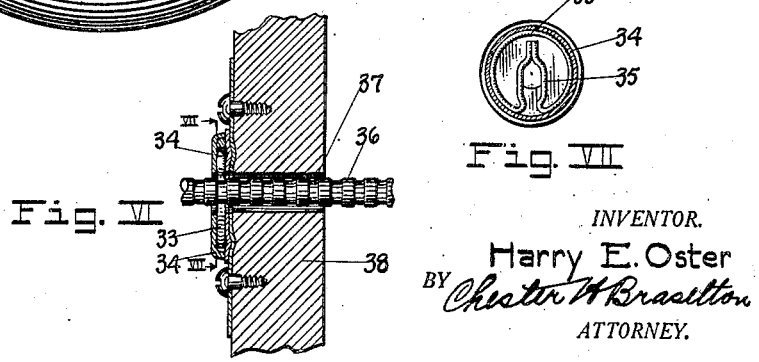
Fig. V
INVENTOR.
Harry E. Oster
BY Chester W Braselton
ATTORNEY.

Patented Oct. 3, 1922.

1,430,839

UNITED STATES PATENT OFFICE.

HARRY E. OSTER, OF TOLEDO, OHIO.

SPOTLIGHT.

Application filed December 18, 1919. Serial No. 345,850.

*To all whom it may concern:*

Be it known that I, HARRY E. OSTER, a citizen of the United States, residing at Toledo, in the county of Lucas, State of Ohio, have invented certain new and useful Improvements in Spotlights, of which I declare the following to be a full, clear, and exact description.

This invention relates to improvements in spotlights, and the present application is a continuation in part of an application for spotlight filed by me August 28, 1918, bearing Serial No. 251,752.

The invention has for its object to provide improved operating and adjusting mechanism for spotlights by which the light may be shifted vertically and horizontally in order that the rays may be directed in different directions as desired.

A further object of the invention is to provide an improved spotlight adjusting mechanism which can be conveniently operated from the inside of a closed automobile body when the light is mounted upon the outside of the body.

A further object of the invention is to provide a lamp movable upon a suitable support with a rotatable operating member therefor having an expansible connection with the lamp to effect movement of the same when said operating member is rotated.

Further objects of the invention relate to improvements in detail forms of construction and to economies in the manner and method of manufacture, and the structure shown, described and claimed herein constitutes one embodiment of the invention, though other embodiments falling within the scope of the appended claims may be evident to those skilled in the art to which the invention appertains.

In the drawings, Figure I is a plan view showing the application of the invention to the body of an automobile.

Figure II is a front elevation of the arrangement shown in Figure I.

Figure III is a side elevation in section taken on line III—III of Figure I.

Figure IV is a rear view of the lamp, partly in section, showing the operating mechanism for moving the lamp upon its horizontal axis.

Figure V is a detail section taken on line V—V of Figure I.

Figure VI is an enlarged fragmentary sectional elevation showing the means for holding the operating rod in the desired position of adjustment.

Figure VII is a detail section taken on line VII—VII of Figure VI.

In the drawings, similar reference numerals refer to similar parts throughout the several views.

Referring to the drawings, 10 represents a portion of the side wall of the vehicle body, preferably one of the corner posts upon the outer front face of which is mounted the lamp support 11 secured by means of the screws 12. The support is provided with a vertically disposed shaft or pivotal member 13 upon which is pivotally mounted the bracket 14 forming, with said support, means for carrying the lamp or lamp casing 15 which is provided with a suitable lens 15' and lamp (not shown). The lamp casing 15 is provided with a lateral hollow extension 16, preferably cylindrical or cup-shaped, and which in the present instance, is projected through an opening in the side wall of the casing near the front thereof and held by the flange 17, which is suitably connected with said casing, as by spot welding. The pivotal or hinged bracket 14 is provided with the vertically disposed angular portion 18 having an opening 19 therein to receive the bolt or shaft 20 forming the horizontal pivot upon which the lamp is adapted to rotate. The outer face of the cup-shaped member 16 is seated upon the angular portion 18 of the bracket and is held in rotative engagement therewith by means of said bolt. A spring washer 21 is mounted between the nut on the outer end of said bolt and said bracket portion 18 whereby the lamp casing is yieldably held upon the bracket and is adapted to be rotated thereon about a horizontal axis by means which will presently be described.

Projecting from the rear of the casing 15 and centrally thereof is a sleeve 22 carrying a socket member 23 as shown in Figures I and IV. A ball and socket connection is carried by said socket member 23 as indicated at 23', and a rod 24 is connected therewith which is loosely and slidably mounted in a sleeve 25 to form an expansible connection between the lamp and the operating rod 26. The outer end of the sleeve member 25 is preferably forked to receive the operating rod 26 and is pivotally connected therewith by means of a pin 27. The operating rod 26 is extended into the body of the car as shown in Figures I and III and is provided on its inner end with an operating handle 28 positioned in convenient reach of the driver. The outer end of the rod 26 is connected with the bracket 14 for moving the same upon its pivot by means of an arm 29 which is provided with a ball and socket connection as indicated at 30 to permit the rod 26 to be turned or rotated upon the arm, said arm being preferably bent at its opposite end to extend through the bracket 14 intermediate its ends as shown in Figure I and is adapted to be held thereon by the clamping nuts 31 and 32, although it may be integrally connected with the bracket if desired. Means for holding the operating rod 26 in any desired position of adjustment comprises a spring 33 carried by a spring housing 34 which is preferably secured to the body of a car on the inner face thereof as shown in Figures III and VI. The spring preferably comprises a single coil with its ends turned inwardly to form the parallel rod engaging portions 35 which extend into the grooves 36 formed upon the rod to grip the same and hold it in various positions of adjustment. However, any other suitable form of spring or spring operated member may be used if desired, for it is not essential that the spring itself engage the rod, as any suitable holding member may be interposed between the spring and rod to serve the same purpose. The opening 37 in the wall 38 of the body, through which the operating rod extends, is somewhat larger than the diameter of the rod to permit free movement of the latter from side to side when it is reciprocated for the purpose of moving the lamp upon the vertical pivot. The spring does not interfere with the rotation of the rod to move the lamp on its horizontal pivot.

From the above description it will be seen that the lamp is mounted for universal movement upon the combined bracket and support and that a single operating member is effective to provide for universal movement of the lamp upon the support.

In the operation of my improved spotlight, if it is desired to move the lamp in a horizontal plane, it is only necessary to move the operating rod 26 inwardly and outwardly as the occasion demands and it will be held in the desired position of adjustment by means of the spring portions 35 engaging the rod within the grooves 36, it being understood that during such operation the rod 24 will slide within the sleeve 25. If, however, it is desired to move the lamp upon its horizontal axis so that the rays of light may be thrown up or down, the rod 26 is rotated in one direction or the other and the lamp is then actuated by the expansible connection comprising the sleeve 25 and rod 24 which is preferably connected with the lamp socket 23 at the rear of the lamp. During this operation the rod 24 will also slide, to a limited extent, within the sleeve 25 since the socket member 23 moves in a vertical plane and the operating rod 26 remains fixed relatively thereto.

While I have shown and described in considerable detail a structure constituting one embodiment of my invention it will be understood that the invention is not limited to the particular embodiment illustrated and described, and that in determining the scope of the invention, only such limitations as may be embodied in the appended claims are to be considered. It will be further understood that the invention as set forth in the claims comprehends both the broader and more limited manner of carrying out the invention and the claims herein are drawn with the idea in view of protecting all novelty inherent in said invention.

What I claim as new and desire to secure by Letters Patent is:

1. A device of the class described comprising a support, a pivotal member thereon, a lamp movable upon said pivotal member, an arm connected with said pivotal member, a reciprocally mounted operating rod rotatably connected with said arm, a member pivoted upon said operating rod and a second member movable upon the last mentioned member and operatively connected with the lamp to move it upon said pivotal member.

2. A device of the class described comprising a support, a pivotal member thereon, a lamp rotatably mounted upon said pivotal member, an arm connected with said pivotal member, a slidably mounted operating rod rotatably connected with said arm, a member pivoted upon said operating rod and operatively connected with the lamp to move it relatively to said pivotal member and means for holding said operating rod in different positions of adjustment.

3. A device of the class described comprising a support, a pivotal member thereon, a lamp rotatable upon said pivotal member, a rotatable reciprocally mounted rod operatively connected with said pivotal member for moving it upon the support when said rod is reciprocated and a plurality of telescoping members interposed between said rod and lamp whereby the latter is rotated upon said pivotal member upon rotation of said rod.

4. A device of the class described comprising a support, a pivotal member thereon, a lamp rotatable upon said pivotal member, a rotatable reciprocally mounted rod operatively connected with said pivotal member for moving it upon the support when said rod is reciprocated, a plurality of telescoping members interposed between said rod and lamp whereby the latter is rotated upon said pivotal member upon rotation of said rod, and means for holding said operating rod in different positions of adjustment.

5. A device of the class described comprising a support, a pivotal member thereon, a lamp movable upon said pivotal member, a rotatable reciprocally mounted rod operatively connected with said pivotal member for moving it upon the support when said rod is reciprocated, a member connected with said rod intermediate its ends and a second member having one end connected with the lamp and its opposite end movable upon the last mentioned member whereby when said operating rod is rotated said lamp will be moved upon said pivotal member.

6. A device of the class described comprising a support, a pivotal member thereon, a lamp movable upon said pivotal member, a rotatable reciprocally mounted rod operatively connected with said pivotal member for moving it upon the support when said rod is reciprocated, a member connected with said rod intermediate its ends, a second member having one end connected with the lamp and the opposite end telescoping with the last mentioned member whereby when said operating rod is rotated said lamp will be moved upon said pivotal member.

7. A device of the class described comprising a support, a pivotal member thereon, a rotatable reciprocally mounted rod operatively connected with said pivotal member for moving it upon the support when said rod is reciprocated, a lamp movable upon said pivotal member and an expansible connection between said rod and said lamp for effecting movement of the lamp upon rotation of said rod.

8. A device of the class described comprising a support, a bracket pivotally mounted thereon, a lamp rotatably mounted upon said bracket, a rotatable and longitudinally movable rod connected with the bracket for moving the same upon its pivot and an expansible connection between said rod and lamp adapted to effect rotation of the lamp upon the bracket when the rod is rotated.

9. A device of the class described comprising a support, a bracket pivotally mounted thereon, a lamp movably mounted upon said bracket, a slidably mounted rod rotatably connected with said bracket, a tubular member pivoted upon said rod and extending laterally therefrom, and a connection telescoping in said tubular member and connected with said lamp to effect movement of the same upon said bracket when the rod is rotated.

10. A device of the class described comprising a support, a bracket pivotally mounted thereon, a lamp rotatably mounted upon said bracket, means for moving said bracket upon its pivot and expansible means connected with said last mentioned means and said lamp for effecting rotation of the same upon said bracket.

11. A device of the class described comprising a support, a bracket pivotally mounted thereon, a lamp rotatably mounted upon said bracket, an arm upon said bracket, a slidably mounted rod rotatably connected with said arm and an expansible connection between said rod and said lamp adapted to effect rotation of the latter upon rotation of the rod.

12. A device of the class described comprising a support, a bracket pivotally mounted thereon, a lamp rotatably mounted upon said bracket, a rotatably and longitudinally movable rod connected with the bracket for moving the same upon its pivot, an expansible connection between said rod and lamp adapted to effect rotation of the lamp upon the bracket when the rod is rotated and means for preventing accidental displacement of the rod longitudinally.

13. A device of the class described comprising a support, a bracket pivotally mounted thereon, a lamp rotatably mounted upon said bracket, a longitudinally movable rod for moving said bracket upon its pivot, an expansible connection between said rod and lamp for effecting rotation of the lamp upon said bracket and yieldable means for holding said rod against longitudinal displacement.

In testimony whereof I affix my signature.

HARRY E. OSTER.